A. C. SARGENT.
ELECTRIC BRAKE DEVICE.
APPLICATION FILED OCT. 12, 1915.
1,266,057.
Patented May 14, 1918.
2 SHEETS—SHEET 2.
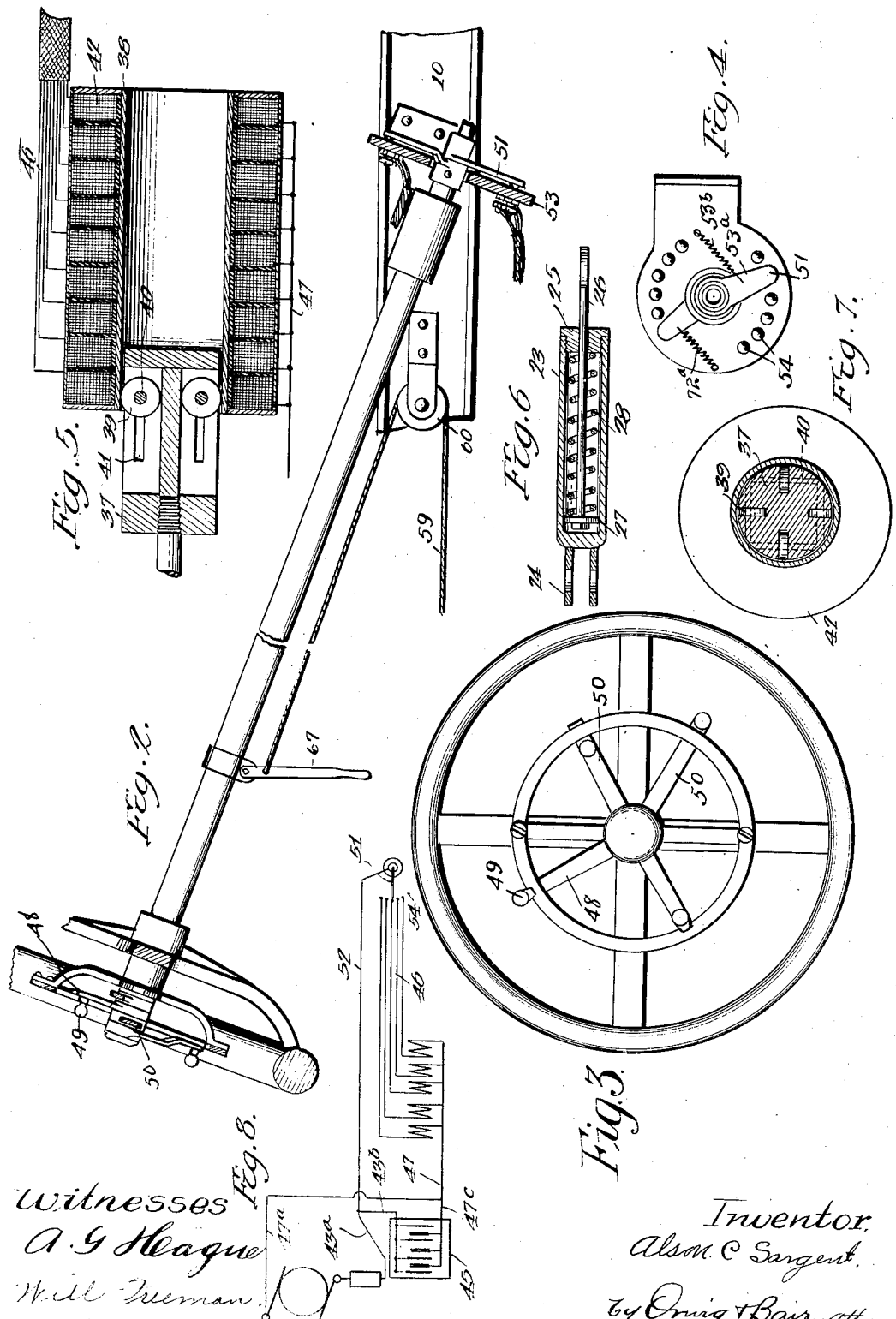
Witnesses
A. G. Hague
Will Freeman
Inventor.
Alson C. Sargent.
by Craig & Bair attys

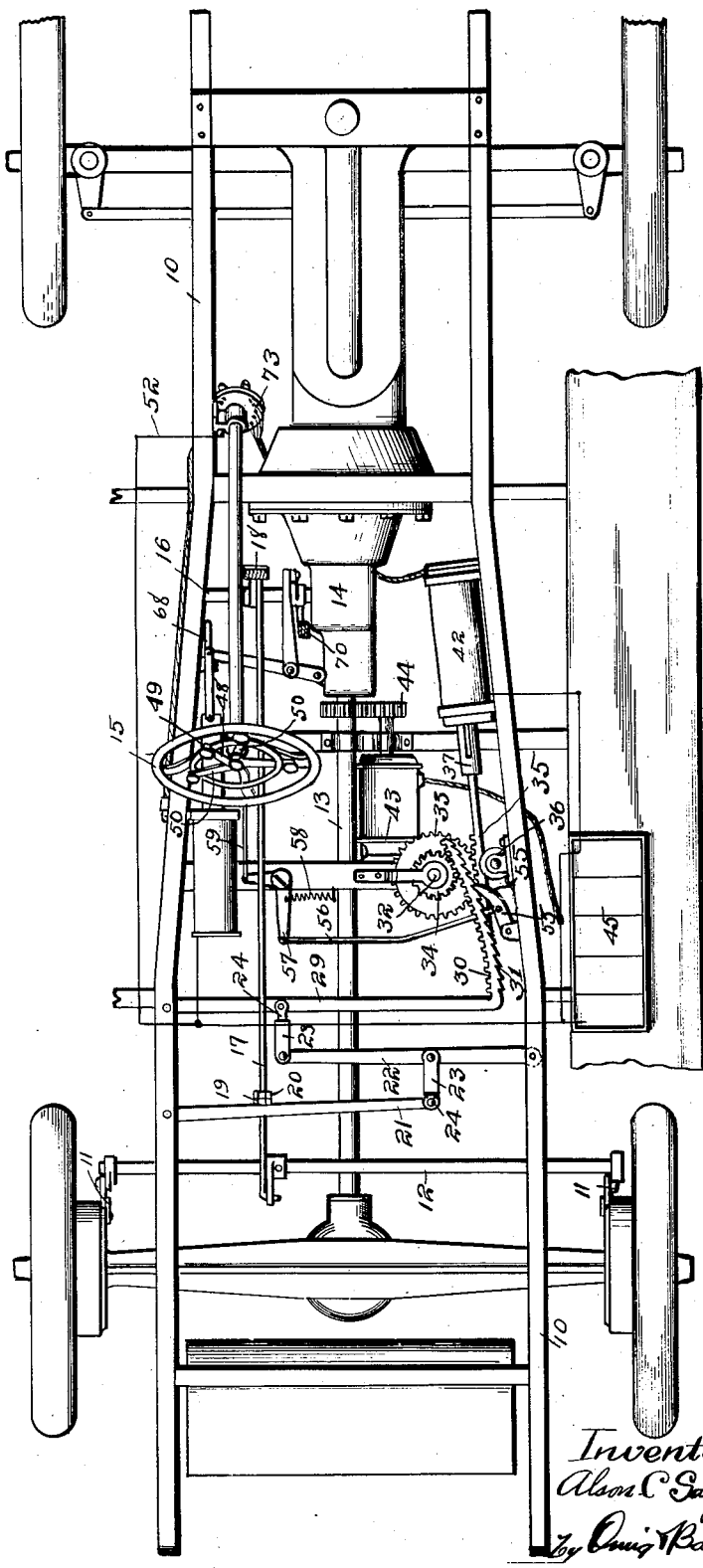

UNITED STATES PATENT OFFICE.

ALSON C. SARGENT, OF DES MOINES, IOWA.

ELECTRIC BRAKE DEVICE.

1,266,057.   Specification of Letters Patent.   Patented May 14, 1918.

Application filed October 12, 1915. Serial No. 55,567.

*To all whom it may concern:*

Be it known that I, ALSON C. SARGENT, a citizen of the United States, and resident of Des Moines, in the county of Polk and State of Iowa, have invented a certain new and useful Electric Brake Device, of which the following is a specification.

The object of my invention is to provide a device of simple, durable and inexpensive construction, designed to be attached to ordinary automobiles and the like for the purpose of controlling a brake by electrically operated means controlled by a switch lever on the steering wheel, whereby the brake may be controlled in a more convenient, facile and safe manner than with the devices now ordinarily used for this purpose.

My invention consists in the construction, arrangement and combination of my improved electric controlling mechanism for the brake, with an ordinary automobile and the like, whereby the objects contemplated are attained, as hereinafter more fully set forth, pointed out in my claims, and illustrated in the accompanying drawings, in which:

Figure 1 shows a plan view of an automobile chassis having my improvements applied thereto as in use.

Fig. 2 shows an enlarged, detail view of the steering wheel standard having the electric switch controlling mechanism applied thereto, and also showing the hand lever for retaining the brake in any set position.

Fig. 3 shows a plan view of the steering wheel, illustrating the arrangement of my improved switch lever thereon.

Fig. 4 shows a detail view, illustrating the switch device whereby the various coils on the solenoid magnets may be successively energized for the purpose of gradually and progressively operating the brake.

Fig. 5 shows an enlarged, detail view, illustrating one of the solenoids with an armature therein, and illustrating the arrangement of the wiring and coils of the solenoid.

Fig. 6 shows an enlarged, detail view, illustrating the yielding coupling for the brake lever.

Fig. 7 shows a detail, end view of one of the solenoids and armatures, illustrating the arrangement of the anti-friction rollers therein, and Fig. 8 illustrates diagrammatically the arrangement of the electrical elements of the apparatus.

Referring to the accompanying drawings, I have used the reference numeral 10 to indicate generally an automobile chassis of ordinary form. 11 indicates the brakes applied to the rear axle, both being connected to the brake beam 12. 13 indicates the main drive shaft, 14 the gear case, 15 the steering wheel, and 16 the clutch operating shaft. All of these parts are of the construction ordinarily employed in automobiles, hence a detailed description of their construction and operation is deemed unnecessary.

My improved electric brake device is preferably applied to the brake rod 17 which is connected ordinarily in automobiles with the foot lever 18 loosely mounted on the clutch shaft 16. Mounted on the brake rod 17 is a nut 19 and a lock nut 20, which are arranged in the path of the lever 21 fulcrumed at one end to the chassis frame. This lever 21 is connected to another lever 22, also fulcrumed to the chassis frame. It is desirable that the connection between the levers 21 and 22 be a yielding connection for the purpose of applying a yielding pressure to the brake. For this purpose I have provided the device illustrated in Fig. 6, consisting of a cylinder 23 having extensions 24 at one end connected to the lever 21, and having a screw cap 25 at its other end through which a plunger 26 is extended. This plunger is connected with the lever 22. Between the screw cap 25 and the head 27 of the plunger, is a coil spring 28 which is so arranged that when the lever 22 is moved there will be a tendency to compress the spring.

The inner end of the lever 22 is in turn connected by means of a yielding connection which may be of the type above described to a lever 29 fulcrumed at one end to the chassis frame, and having at its other end a curved rack 30 provided with ratchet teeth 31. The arrangement of the levers 21, 22 and 29 is such that power applied to the rack 30 will be multiplied as applied to the brake rod 17.

For operating the rack 30 I have provided on the chassis frame an upright shaft 32, having fixed to it a large pinion 33 and a small pinion 34. This pinion 34 is in mesh with the rack 30 and the large pinion 33 is engaged by a rack bar 35, the rack bar 35 being held in such engagement by the roller 36. This rack bar 35 is provided on one end with an armature 37 arranged to slidingly operate within the solenoid hereinafter described. This solenoid and its armature are illustrated in detail in Fig. 5, and the solenoid comprises a cylinder 38 into which the armature 37 is inserted. I preferably provide the armature 37 with a series of rollers 39, having their shafts 40 arranged in the slots 41 for the purpose of reducing the friction between the armature and the cylinder 38. Arranged on the exterior of the cylinder 38 is a series of coils 42, each coil being arranged in the manner of an ordinary solenoid whereby when it is energized it will form an electromagnet and cause the armature to move toward it.

In this connection it is to be understood that I have provided means hereinafter described, whereby these coils may be successively energized for the purpose of drawing the armature as far as may be desired into the interior of the solenoid, the coils at the rear end of the solenoid being cut out as the coils toward the front end are energized.

I have provided a generator 43 and a storage battery 45, which are so connected with each other and with the coils of the solenoid and with the switch 51, that when the car is running, either under the impetus of the engine or coasting, then upon the proper manipulation of the switch, the solenoid will be energized from the generator. When the car is stopped and the generator is inactive, then upon the proper manipulation of the switch 51, the solenoid will be energized from the battery.

The switch lever 51 is mounted on the steering post, and adjacent thereto is a plurality of contact points 54 adapted to selectively contact with the switch lever 51.

The generator 43 is connected with the switch lever by means of a wire 43$^a$ and a wire 52. The generator is connected with one end of all of the coils of the solenoid by means of a wire 47$^a$ and a common return wire 47. The opposite ends of the solenoid coils are connected with the respective contact points 54 by wires 46.

The generator is connected with the battery by means of a wire 43$^a$ and the wire 43$^b$ and with the other side of the battery by means of the wire 47$^a$ and the wire 47$^c$.

The battery 45 is connected with the switch lever by means of the wire 43$^b$ and the wire 52, as shown in Fig. 8 and is connected with one end of the respective coils of the solenoid by means of the wires 47$^c$ and the common return wire 47. The wires 46 lead from the opposite ends of the respective coils of the solenoid.

The generator is connected by gears 44 with the drive shaft 13, so that when the drive shaft is being operated, and the switch is closed by moving the lever to contact with one of the points 54, a circuit will be established from the generator through the wire 43$^a$, the wire 52, the switch lever 51, the selected contact point 54, one of the wires 46, the solenoid, the wire 47, and the wire 47$^a$. This circuit for convenience sake I will call circuit "X."

When the drive shaft is being operated and the switch is open, the battery is charged from the generator, the circuit being established through the wire 43$^a$, the wire 43$^b$, the battery, the wire 47$^c$ and the wire 47$^a$. This circuit for convenience sake I will call circuit Y.

When, however, the drive shaft is not operated and the generator is consequently inoperative and the switch is closed, a circuit will be established from the battery through the wire 43$^b$, the wire 52, the switch lever 51, the selected contact point 54, one of the wires 46, the coils of the solenoid, the common return wire 47, and the wire 47$^c$. This circuit for convenience sake I will call circuit Z.

The parts are so arranged that the electromotive force of the battery is opposed to the electromotive force of the generator.

It will be noted from the foregoing description what the different paths of electrical energy will be when the switch is closed and the generator is operated at various speeds. When the switch is open and the circuit Z is broken and the circuit X is broken, and the generator is operated at any speed, the electricity from the generator will pass through the circuit Y for charging in the battery for future use.

It will be noted in this connection that the generator is the primary source of electrical energy for energizing the solenoid coils, and that the battery is a secondary source of electrical energy acting at times in the capacity of what might be termed an electrical governor, and at other times in the capacity of what may be termed an electrical storage tank.

My improved means for controlling the switch by means of a lever on the steering wheel, comprises a lever 48 mounted at the center of the steering wheel and provided with a handle 49 which may be grasped and moved by the operator with the same ease and facility as the levers 50 ordinarily provided for controlling the gas and advancing the spark. This lever 48 is connected by a suitable sleeve not shown, with a switch lever 51 at the lower end of the steering wheel standard. This switch lever is electrically connected with the battery 45 by the conductor 52, which is also connected with the wire 43$^a$, and arranged adjacent to it in a stationary position is an insulator plate 53 having a series of contacts 54 each of which is electrically connected with one of the conductors 46 leading to the coils of the solenoid.

By means of the construction heretofore described, it is obvious that when it is desired to operate the brake, the operator need only move the lever 48 whereupon the first solenoid coil is energized and the brake set to a slight extent. Then as the lever 48 is progressively moved to form a contact between the switch 51 and the contact points 54 the various solenoid coils are progressively energized, thus drawing the armature further into the solenoid cylinder and setting the brake tighter on each progressive movement of the armature. A spring 53$^b$ is preferably provided to return the switch 51 to normal position when released, but so long as the operator grasps the lever 48 he may return the switch slowly to normal position, thus gradually and slowly releasing the brake.

I preferably arrange my electric control for the brake so that it will not in any way interfere with the ordinary foot pedal control through the pedal 18 and brake rod 17.

In order to hold the brake in any of the various positions in which it may be set by means of my electric controlling device, I have provided a pawl 55 to engage the ratchet teeth 31 of the rack 30. This pawl is connected by a rod 56 with the bell crank lever 57. This lever is provided with a spring 58 for yieldingly holding the pawl out of engagement with the ratchet teeth. The other end of the bell crank lever 57 is connected to a cable 59 which cable runs over a direction pulley 60 and is attached to a lever 67 on the steering wheel standard so that when it is desired to retain the brake in any position in which it may have been set, the operator simply pulls the lever 67, thus throwing the pawl 55 into engagement with the ratchet teeth. Ordinarily this pawl is not used when the electric brake device is being operated, but it is useful when it is desired to retain the car in a standing position for a relatively long time.

It will be noted that when the pawl 55 has been once moved into engagement with the teeth 31, on account of the shape of the notches or teeth 31, on the rack bar 30, the pawl will be held until the rack bar is operated by rotating the shaft 32 for permitting the pawl 55 to move out of one of the notches 31.

Assuming that the pawl 55 has been set in one of the notches 31 and that it is desired to release it, then the lever 48 is operated to move the switch lever 51 to the proper contact point for tightening the brake. The current for this purpose is furnished from the battery 45. As soon as the rack 30 moves a sufficient distance, to permit the release of the pawl 55, the spring 58 will move said pawl out of engagement with the notch on the rack bar 30.

In practical use it is obvious that my improved electrical controlling mechanism adds greatly to the convenience and safety of the operator. There is an advantage in having the generator geared direct to the drive shaft so that it may be generating when the machine is coasting. The operator always has the steering wheel control in front of him and easily accessible so that when it is desired to apply the brakes he need not hunt for the brake pedal but may use the lever 48 on the steering wheel to set the brakes.

Another very advantageous feature is that the brakes may be set just as slightly or just as hard as desired, and this with my improved device can be done with great accuracy because the operator may judge by the position of the lever 48 just how hard the brakes have been set up. By means of the ratchet device 55 the operator may first set the brakes by the electric control and then hold them in said position by the hand lever 67 as long as desired without using the electric current for holding the brakes.

By means of my improved construction it is not necessary to have a solenoid of excessive weight or magnetic power, because the pull applied by the coils to the armature is greatly multiplied during its transmission to the brake beam both by the pinions 34 and 33 and by the levers 29, 22 and 21.

I consider the use of the generator, as shown, one of the important features of my invention. With the wiring shown in the diagram in Fig. 8, when the car is stopped and the generator is not in operation, the parts may be operated, when the switch is properly turned, by means of electrical energy from the battery.

When, however, the car is in motion and the generator is in operation, it will readily be seen that the resistance through the main circuit will be less than the resistance in the battery, so that the battery will not be affected in any way, and the parts will be operated from the generator direct without reducing the charge in the battery. Thus when the car is standing the current from the battery will pass through the wires 52 to the solenoid and thence through the wire 47 to the battery.

Another important advantage of the combination herein described, arises from the use of the generator and the battery connected as set forth, whereby, if the brake is applied while the machine is running at a considerable speed and the speed of the car is thereby reduced, so that the car is running comparatively slowly, then the generator will not be operated fast enough to maintain electrical energy through the circuit heretofore described, in sufficient strength to hold the brake with the required force, whereupon a circuit will be established through circuit Z, as hereinbefore described, so that the brake will be properly held for affording absolute control of the car at all times, which control will be even and uniform during a period when the potential of the generator is reduced to the extent that it does not supply sufficient current without the aid of the battery.

I claim as my invention:

1. In a device of the class described, the combination of a vehicle having a movable member and a power shaft, with an electrically operated mechanism for controlling said movable member comprising an electromagnet having an armature and a plurality of coils, means for operatively connecting said armature with said movable member, a generator operatively connected with the power shaft, a battery, a switch lever, a plurality of contact points adapted to be selectively in contact with said lever, means for selectively, electrically connecting the respective coils with the respective contact points, means for connecting said generator electrically with said switch lever, a common return wire connecting said coils with said battery, means for electrically connecting said generator with said common return wire, said device including means for electrically connecting the battery with the generator and with the switch lever, whereby when the generator is in operation at a high generated speed and the switch is closed, a circuit will be established from the generator through the switch in the electro-magnet, and when the switch is open a circuit will be established from the generator through the battery, and when the power shaft is being operated and the switch is closed a circuit will be established from the battery through the switch in the electro-magnet, there being a shunt circuit connection at the same time including the generator, switch, battery and solenoid, whereby when the generator is operating at low speed insufficient to operate the solenoid, the battery will contribute to the current in the electro-magnet.

2. In a device of the class described, the combination of a vehicle, having a movable member and a power shaft, with an electrically operated mechanism for controlling said movable member, comprising an electromagnet having an armature operatively connected with said movable member, a battery, a switch lever, and a plurality of contact points adapted to be selectively in contact with said lever, said electromagnet having a plurality of coils, means for selectively electrically connecting the respective coils with the respective contact points, said device including a force multiplying device interposed between the armature of the solenoid and the movable member, whereby a comparatively slight pull applied by the armature will be greatly increased as applied to the movable member, said last described means including a pinion, a rack connected with the solenoid armature meshing with said pinion, a second pinion operatively connected with the first pinion, a lever pivoted on the frame of the vehicle and having formed thereon on a curved rack in mesh with said second pinion, a compound lever operatively connected with said last lever and with said movable member.

3. In a device of the class described, the combination of a vehicle, having a movable member, with an electrically operated mechanism for controlling said movable member, comprising an electromagnet having an armature operatively connected with said movable member, a battery, a switch lever, and a plurality of contact points adapted to be selectively in contact with said lever, said electromagnet having a plurality of coils, means for selectively, electrically connecting the respective coils with the respective contact points, said device including a power multiplying device interposed between the armature of the solenoid and the movable member, whereby a comparatively slight pull applied by the armature will be greatly increased as applied to the movable member, said last described means including a pinion, a rack connected with the solenoid armature and meshing with said pinion, a second pinion operatively connected with the first pinion, a lever pivoted on the frame of the vehicle and having formed thereon a curved rack in mesh with said second pinion, a compound lever operatively connected with said last lever, and with said movable member, said curved rack having notches, a pawl pivotally mounted and designed to coact with said notches, and a device for yieldingly holding said pawl out of engagement with said notches.

Des Moines, Iowa, September 4, 1915.

ALSON C. SARGENT.

Witnesses:
A. SHERMAN,
J. MAHER.